(12) United States Patent
Yu

(10) Patent No.: US 7,895,186 B2
(45) Date of Patent: Feb. 22, 2011

(54) METHOD AND MECHANISM OF MATERIALIZED VIEW MIX INCREMENTAL REFRESH

(75) Inventor: Tsae-Feng Yu, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 902 days.

(21) Appl. No.: 11/123,922

(22) Filed: May 6, 2005

(65) Prior Publication Data

US 2006/0253483 A1  Nov. 9, 2006

Related U.S. Application Data

(60) Provisional application No. 60/667,183, filed on Mar. 31, 2005.

(51) Int. Cl.
G06F 7/00 (2006.01)
G06F 17/30 (2006.01)

(52) U.S. Cl. ............ 707/713; 707/717; 707/999.101; 711/173

(58) Field of Classification Search ....... 707/100–104.1
See application file for complete search history.

(56) References Cited

U.S. PATENT DOCUMENTS

| 6,003,036 | A | * | 12/1999 | Martin | 707/102 |
|---|---|---|---|---|---|
| 6,125,360 | A | * | 9/2000 | Witkowski et al. | 707/2 |
| 6,134,543 | A | * | 10/2000 | Witkowski et al. | 707/2 |
| 6,334,128 | B1 | * | 12/2001 | Norcott et al. | 1/1 |
| 6,546,402 | B1 | * | 4/2003 | Beyer et al. | 707/201 |
| 6,708,179 | B1 | * | 3/2004 | Arora | 707/102 |
| 6,847,971 | B1 | * | 1/2005 | Balaraman et al. | 707/101 |
| 6,882,993 | B1 | * | 4/2005 | Lawande et al. | 707/2 |
| 6,957,225 | B1 | * | 10/2005 | Zait et al. | 1/1 |
| 7,111,020 | B1 | * | 9/2006 | Gupta et al. | 707/201 |
| 7,158,994 | B1 | * | 1/2007 | Smith et al. | 707/103 R |
| 2003/0009431 | A1 | * | 1/2003 | Souder et al. | 707/1 |
| 2004/0034616 | A1 | * | 2/2004 | Witkowski et al. | 707/1 |
| 2004/0122828 | A1 | * | 6/2004 | Sidle et al. | 707/100 |
| 2004/0122868 | A1 | * | 6/2004 | Chan et al. | 707/200 |
| 2005/0015436 | A1 | * | 1/2005 | Singh et al. | 709/203 |
| 2005/0055382 | A1 | * | 3/2005 | Ferrat et al. | 707/201 |
| 2005/0091180 | A1 | * | 4/2005 | Peleg et al. | 707/1 |
| 2005/0234971 | A1 | * | 10/2005 | Folkert et al. | 707/102 |
| 2005/0235001 | A1 | * | 10/2005 | Peleg et al. | 707/200 |
| 2006/0047622 | A1 | * | 3/2006 | Folkert et al. | 707/1 |
| 2006/0122964 | A1 | * | 6/2006 | Yu et al. | 707/2 |
| 2006/0212436 | A1 | * | 9/2006 | Gupta et al. | 707/3 |

OTHER PUBLICATIONS

Oracle9i, Data Warehousing Guide, Release 2 (9.2), Mar. 2002, pp. 1,2,34,64,98,107,144,150,160,165,169,287,290,296,299,302,303, 304,337,518,617,618,619,636.*

Oracle 9i, Data Warehousing Guide, Release 2 (9.2), Mar. 2002, pp. 65, 110, 114, 147, 152, 301, and 442.*

* cited by examiner

*Primary Examiner*—Mohammad Ali
*Assistant Examiner*—Angelica Ruiz

(57) ABSTRACT

A method and system for updating both partition change track tables and non-partition track tables in a materialized view. A log-based incremental refresh is performed on the materialized view and a partition change tracking based refresh is performed on the materialized view. The dependency of the materialized view log for the partition change track base table is removed.

20 Claims, 4 Drawing Sheets

ΔFACT: changed partitions in FACT
ΔSTORE: changed partitions in STORE
ΔTIME: changed rows in TIME
ΔPROMOTION: changed rows in PROMOTION Phase 1: apply non-PCT table changes (using materialized view logs) =
ΔTIME x FACT x STORE x PROMOTION + TIME x FACT x STORE x Δ PROMOTION Pass 1 of Mix Incremental Refresh Figure 1: Pass 1 of Mix Incremental Refresh

METHOD AND MECHANISM OF MATERIALIZED VIEW MIX INCREMENTAL REFRESH

CROSS-REFERENCE TO RELATED APPLICATIONS

This application claims priority from U.S. Provisional Patent Application No. 60/667,183 filed on Mar. 31, 2005.

BACKGROUND OF THE INVENTION

1. Field of the Invention

The present invention generally relates to materialized views and, more particularly, to the incremental refresh of the materialized view.

2. Brief Description of Related Developments

The materialized view is an Oracle object that records valuable summary data in the data warehouse environment. Extracting summary data from a data warehouse often requires a time-consuming and expensive process through complex queries with join and/or aggregate constructs. As more periodical changes made to the tables in the data warehouse, maintaining summary data in the materialized views becomes an increasingly important topic. It is not practical to always rebuild the materialized views from scratch (i.e., complete refresh) due to the expensive nature.

The materialized view maintains pre-calculated data resulting from highly aggregated/joined queries. It has been increasingly and widely used in the data warehouse application to achieve high-performance query processing in accessing huge amount of historical data. Its values can be seen in the two aspects as query rewrite and incremental refresh. The query rewrite mechanism achieves better query processing performance by rewriting the given query in terms of the materialized view. The response time is thus shortened by using pre-calculated results in the materialized view. On the other hand, the incremental refresh provides a faster mechanism to synchronize the data between the base tables and the materialized view.

In the past, the materialized view was "atomic and treated as an unseparatable object so that the status of its data can only be either globally fresh or global stale. It is a serious drawback that affects the availability of the materialized view. For example, when any of the base tables of the materialized view gets updated, the materialized view immediately becomes globally "stale". All the data in the materialized view becomes distrusted and unusable in the query rewrite (unless lowering the confidence level) since there is no easy way to identity which part of the data gets affected by the changes. Later, with the partition change tracking technique, the staleness of the materialized view is separated at the partition level.

In the materialized view maintenance, the row-based incremental refresh (using log with changed data rows) was the only data synchronization approach without needing to recalculate the data of the materialized view (i.e., complete refresh). However, the row-change-based incremental refresh has its limitations. For example, when the base table is partitioned (e.g., by range) and a partition maintenance operation (e.g., exchange partitions) occurs, the existing row-based incremental refresh is unable to handle such partition change. As a result, the only way to bring the materialized view back to the fresh state is through the complete refresh that is very expensive especially with a large amount of data. It is noted that the use of data partitioning becomes even more popular and is increasingly adopted in the OLAP system and very suitable for managing historical data. Lacking the ability of incrementally refreshing the materialized view after partition maintenance operations is a serious disadvantage.

The incremental refresh approach to materialized view maintenance incrementally applies the changes in the tables of the data warehouse to refresh the materialized views (i.e., incremental refresh). To enable the incremental refresh, catching change data made through various operations including conventional operations (e.g., INSERT, UPDATE and DELETE), direct path load and PMOP (partition maintenance operation) is the fundamental step. To catch conventional DML operations to the base table of the materialized view, a materialized view log is created and associated with the base table. When the base table is changed by conventional DML operations, the information of changed rows is recorded in the materialized view log. During the incremental refresh of the materialized view, the change data recorded in the materialized view log is used to determine what changes need to be made to the materialized view. Therefore, the materialized view log has been a mandatory requirement for the materialized view supporting incremental refresh. Without the materialized view log, the log-based incremental refresh is not possible.

As mentioned previously, a partition-based ("PCT") incremental refresh approach was proposed to refresh the materialized view using partition change information and partition change tracking. The refresh algorithm for the partition-based incremental refresh does not require the materialized view log if the materialized view meets PCT (Partitioning Change Tracking) requirements and only PCT base tables are updated. However, the PCT incremental refresh cannot handle the case when the non-partitioned base table changes. In the general case when both non-partitioned and partitioned base tables are changed and partitioned base tables have partition maintenance operations, no existing incremental refresh method is available to use. Also, the current log-based (FAST) refresh method heavily relies on the materialized view logs of all base tables, but recording and maintaining those logs cause huge processing overheads during DML operations and materialized view refresh, respectively. Removing the dependency on the materialized view log is a very difficult refresh issue.

SUMMARY OF THE INVENTION

The present invention is directed to a method and system for updating both partition change track tables and non-partition track tables in a materialized view. In one embodiment the method includes performing a log-based incremental refresh on the materialized view and performing a partition change tracking based refresh on the materialized view. Dependency on the materialized view log for the PCT base table is eliminated and not required.

In another aspect, the present invention is directed to the incremental maintenance of a materialized view. In one embodiment, a method includes applying row changes from non-PCT base tables to the materialized view and applying partition changes from the PCT base tables to the materialized view.

In a further aspect, the present invention is directed to a method of fast incremental refresh of a materialized view. In one embodiment the method includes creating a materialized view from one or more base tables including at least one partitioned PCT table and at least one non-partitioned base table. The partition keys of the at least one partitioned PCT base table are stored on a defining query of the materialized view. Materialized view logs are created for all non-partitioned tables and any row changes from the at least one non-PCT base table are applied to the materialized view. Partition changes from the at least one PCT base table are also applied to the materialized view.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
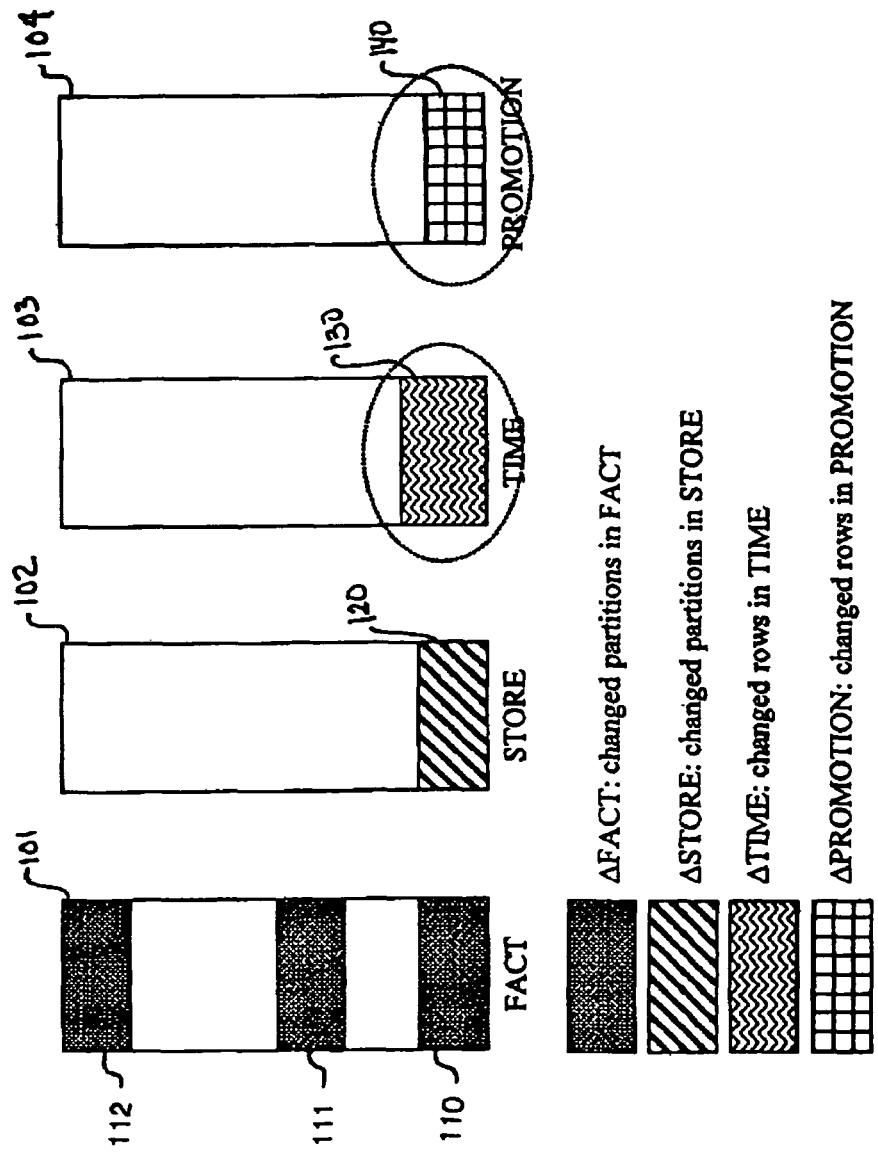
FIG. 1 is an illustration of one embodiment of a first phase of a mix incremental refresh process incorporating features of the present invention.

Referring to FIG. 1, one embodiment of a process incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

The disclosed embodiments provide an incremental refresh of the materialized view based on a mixed approach of incremental refresh, referred to herein as a MIX refresh, when both the PCT base table and non-PCT base table of the materialized view get changed. For example, a partition maintenance operation (PMOP) such as exchange partition can be done on a PCT base table and DML changes can be done on a non-PCT base table. The disclosed embodiments provide an incremental refresh solution that supports the general update scenario where both PCT and non-PCT tables are updated with any types of changes (e.g., conventional DMLs, direct load insert and partition maintenance operations). Previously, the only method to refresh the materialized view is through complete refresh (re-compute the data from scratch) which is very expensive and is virtually impractical to use when the base tables are large.

The disclosed embodiments also remove the dependency on the materialized view log for the PCT base table and provide a log-less incremental refresh on the PCT base table. The materialized view that has PCT base tables no longer requires the materialized view logs on those PCT base tables. There are many advantages to remove the dependency on the materialized view log for those PCT tables. First of all, it eliminates the storage and the change logging overhead for the materialized log when a PCT base table gets updated. Second, since there is no need for the materialized view log, the incremental refresh does not need to pay the materialized view log maintenance cost (e.g. log recording/setup/purging) for those PCT base tables. Currently, the materialized view log maintenance during refresh has caused a big performance overhead and slowed down the refresh execution. Without the materialized view log on the PCT table, the DML on that table can be executed faster by avoiding change recording overhead.

Figure 2:
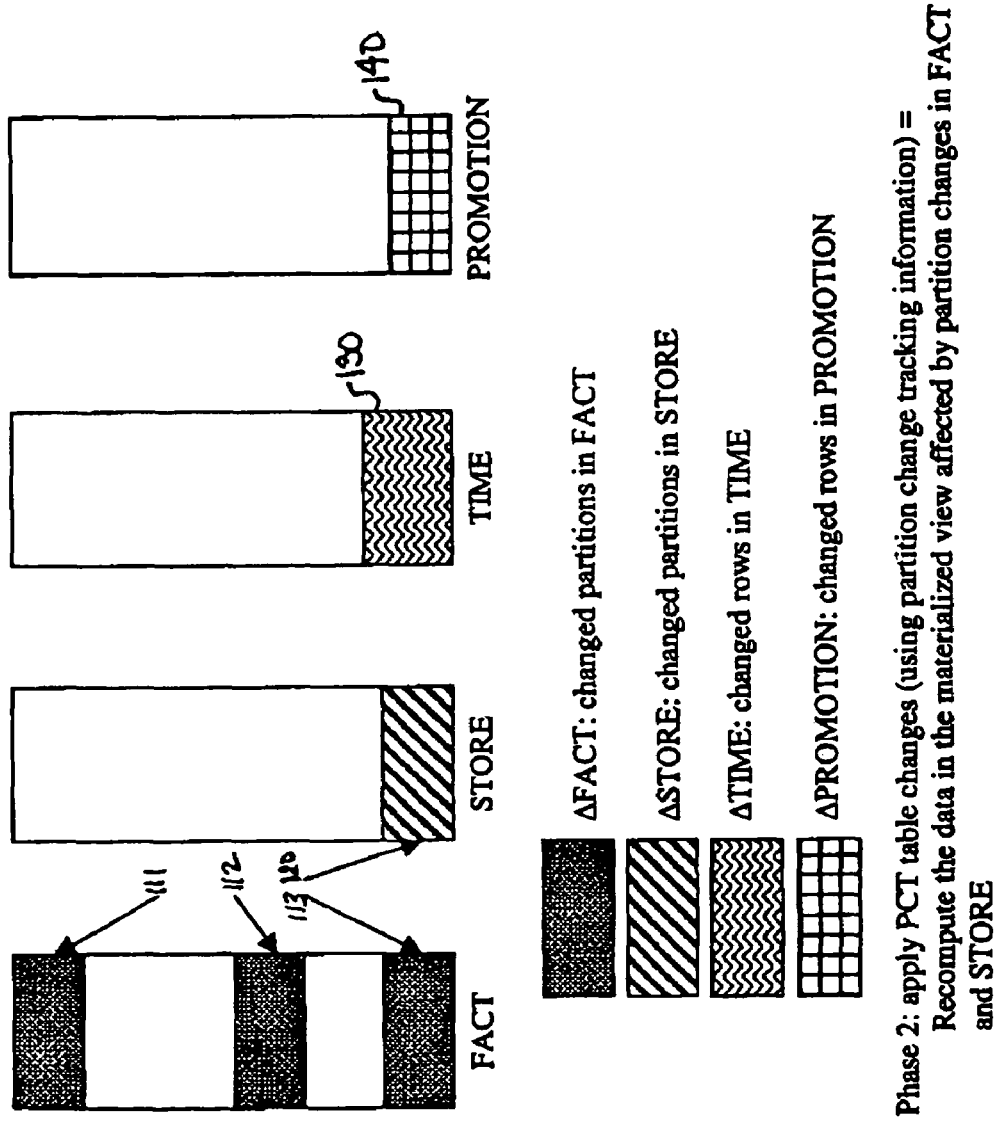
FIG. 2 is an illustration of one embodiment of a second phase of a mix incremental refresh process incorporating features of the present invention.

Referring to FIGS. 1 and 2, the disclosed embodiments combine the conventional log-based incremental refresh and the partition change tracking (PCT) based refresh approaches and generally includes two phases. The first phase, referring to FIG. 1, is to apply the changes of non-PCT base tables (using materialized view logs and/or direct load log) to the materialized view. The second phase, referring to FIG. 2, includes applying the changes of PCT base tables (using partition change information such as partition range values and partition system change numbers ("SCN") changes, to the materialized view.

Referring to FIG. 1, one example of a materialized aggregate view is shown to illustrate how the MIX refresh works. Four base tables, identified as FACT 101, STORE 102, TIME 103 and PROMOTION 104, are referenced by the materialized view, SUMMARY_MAV. Among the four base tables, FACT 101 and STORE 102 are partitioned PCT tables, while TIME 103 and PROMOTION 104 are regular, non-partitioned tables. As illustrated in FIG. 1, the areas 110, 111 and 112 of the FACT table 101 and the area 120 in the STORE table 102 represent the changed partitions. The area 130 in the TIME table 103 and the area 140 in the PROMOTION table 104 represent the changed rows. The general specifications of the tables 101-104 can be indicated as follows:

| FACT | | | | | | |
|---|---|---|---|---|---|---|
| TIME_KEY | MONTH | WEEK | STORE KEY | PROMOTION KEY | DOLLAR SALES | DOLLAR COST |

(List Partitioned by WEEK)

| STORE | | |
|---|---|---|
| STORE_KEY | STORE_NAME | REGION |

(Range Partitioned by STORE_KEY)

| TIME | | | | | |
|---|---|---|---|---|---|
| TIME_KEY | MONTH | YEAR | WEEK | QUARTER | FISCAL_QTR |

| PROMOTION | | | |
|---|---|---|---|
| PROMOTION_KEY | PROMOTION_COST | PROMO_START_DATE | PROMO_END_DATE |

The materialized view, SUMMARY_MAV, is created with the following CREATE MATERIALIZED VIEW statement:

```
CREATE MATERIALIZED VIEW summary_mav
  BUILD IMMEDIATE
  REFRESH FAST ON DEMAND
  AS
  SELECT pf.week, s.store_key, s.store_name, p.promotion_key,
         AVG(pf.dollar_sales) as avg_sales,
         COUNT(*) as cnt, COUNT(pf.dollar_sales) as cnt_dsales
  FROM fact pf, store s, promotion p, time t
  WHERE s.store_key = pf.store_key and
        pf.time_key = t.time_key and
        pf.promotion_key = p.promotion_key
  GROUP BY pf.week, s.store_key, s.store_name,
        p.promotion_key;
```

It is noted that in the above CREATE MATERIALIZED VIEW statement both partition keys of tables FACT and STORE are in the materialized view's defining query and meet PCT requirements. As a result, both tables (FAST and STORE) do not need materialized view logs (as claimed in this invention). The other two base tables (TIME and PROMOTION) are regular base tables having materialized view logs created on them. That is, the materialized view only needs materialized view logs on regular base tables. Assume that the following complex update scenario happens:

```
Delete from FACT where month = 199802 and dollar_sales < 10.
Insert into FACT with new rows of data.
Update PROMOTION set promotion_key=100 where <condition>
Insert into TIME with new rows.
Add and Drop partitions in FACT.
Split one partition in STORE into two and add more rows.
```

As seen in FIG. 1, phase 1 of the refresh execution deals with the changes in the regular base tables using materialized view logs. The non-PCT table changes are applied using the materialized view logs. The application of the non-PCT table changes can be written as ΔTIME×FACT×STORE×PROMOTION+TIME×FACT×STORE×ΔPROMOTION.

In this example, TIME and PROMOTION were changes with new rows are inserted and some rows are updated, respectively. Those changes are recorded in their corresponding materialized view logs. Then, the changes in TIME and PROMOTION are individually used to join with other base tables to figure out what changes should be made to SUMMARY_MAV.

The following refresh statements are generated to refresh the materialized view SUMMARY_MAV for phase 1 with the changes from TIME and PROMOTION. It is noted that there are two MERGE INTO statements to apply changes from TIME and PROMOTION individually. There is a DELETE statement to remove intermediate results whose count(*) value becomes 0 (rows with count(*)=0 should be removed from the materialized view as they are not semantically meaningful).

```
/* MV_REFRESH (MRG) */ MERGE INTO "GROCERY"."SUMMARY_MAV" "SNA$"
USING
(SELECT /*+ OPT_ESTIMATE(QUERY_BLOCK MAX=1000) */
   "MAS$3"."WEEK" "GB0",
   "MAS$2"."STORE_KEY" "GB1", "MAS$2"."STORE_NAME" "GB2",
   "DLT$1"."PROMOTION_KEY" "GB3",
   SUM(DECODE("DLT$1"."DML$$", 'I', 1, -1)*
DECODE(("MAS$3"."DOLLAR_SALES"), NULL, 0, 1)) "D0",
   SUM(DECODE("DLT$1"."DML$$", 'I', 1, -1)) "D1",
   NVL(SUM(DECODE("DLT$1"."DML$$", 'I', 1, -1)*
("MAS$3"."DOLLAR_SALES")), 0) "G0"
 FROM (SELECT "MAS$"."ROWID" "RID$" , "MAS$"."TIME_KEY"
    FROM "GROCERY"."TIME" "MAS$") AS OF SNAPSHOT (:3) "PRE$0" ,
    (SELECT /*+ CARDINALITY(MAS$ 2) */
      CHARTOROWID("MAS$"."M_ROW$$") RID$,
      "MAS$"."PROMOTION_KEY",
      DECODE("MAS$".OLD_NEW$$, 'N', 'I', 'D') DML$$
     FROM "GROCERY"."MLOG$_PROMOTION" "MAS$"
     WHERE "MAS$".SNAPTIME$$ > :1 ) AS OF SNAPSHOT (:3) "DLT$1" ,
    (SELECT "MAS$"."ROWID" "RID$",
      "MAS$"."STORE_NAME", "MAS$"."STORE_KEY"
     FROM "GROCERY"."STORE" "MAS$") AS OF SNAPSHOT (:3) "MAS$2" ,
    (SELECT "MAS$"."ROWID" " RID$",
      "MAS$"."WEEK", "MAS$"."STORE_KEY", "MAS$"."TIME_KEY",
      "MAS$"."PROMOTION_KEY", "MAS$"."DOLLAR_SALES"
     FROM "GROCERY"."FACT" "MAS$") AS OF SNAPSHOT (:3) "MAS$3"
 WHERE ("MAS$2"."STORE_KEY"="MAS$3"."STORE_KEY" AND
    "MAS$3"."TIME_KEY"="PRE$0"."TIME_KEY" AND
    "MAS$3"."PROMOTION_KEY"="DLT$1"."PROMOTION_KEY") AND
    SYS_OP_MAP_NONNULL("PRE$0"."RID$") NOT IN
```

-continued

```
       (SELECT * FROM
         (SELECT /*+ CARDINALITY(MAS$ 1) ANTIJOIN */
            SYS_OP_MAP_NONNULL(CHARTOROWID("MAS$"."M_ROW$$")) RID$
          FROM "GROCERY"."MLOG$_TIME" "MAS$"
          WHERE "MAS$".SNAPTIME$$ > :2 ) AS OF SNAPSHOT (:3) MAS$)
   GROUP BY "MAS$3"."WEEK","MAS$2"."STORE_KEY",
        "MAS$2"."STORE_NAME","DLT$1"."PROMOTION_KEY")"AV$"
ON (SYS_OP_MAP_NONNULL("SNA$"."WEEK")=
     SYS_OP_MAP_NONNULL("AV$"."GB0") AND
   SYS_OP_MAP_NONNULL("SNA$"."STORE_KEY")=
     SYS_OP_MAP_NONNULL("AV$"."GB1") AND
   SYS_OP_MAP_NONNULL("SNA$"."STORE_NAME")=
     SYS_OP_MAP_NONNULL("AV$"."GB2") AND
   SYS_OP_MAP_NONNULL("SNA$"."PROMOTION_KEY")=
     SYS_OP_MAP_NONNULL("AV$"."GB3"))
WHEN MATCHED THEN
UPDATE SET "SNA$"."CNT_DSALES"="SNA$"."CNT_DSALES"+"AV$"."D0",
   "SNA$"."CNT"="SNA$"."CNT"+"AV$"."D1",
   "SNA$"."AVG_SALES"=
     DECODE("SNA$"."CNT_DSALES"+"AV$"."D0",0,TO_NUMBER(NULL),
     ((NVL("SNA$"."AVG_SALES",0)*"SNA$"."CNT_DSALES")+"AV$"."G0")/
       ("SNA$"."CNT_DSALES"+"AV$"."D0"))
WHEN NOT MATCHED THEN
INSERT ("SNA$"."WEEK", "SNA$"."STORE_KEY", "SNA$"."STORE_NAME",
        "SNA$"."PROMOTION_KEY",
        "SNA$"."CNT_DSALES", "SNA$"."CNT", "SNA$"."AVG_SALES")
VALUES ("AV$"."GB0", "AV$"."GB1", "AV$"."GB2", "AV$"."GB3",
        "AV$"."D0", "AV$"."D1",
DECODE("AV$"."D0",0,TO_NUMBER(NULL),"AV$"."G0"/"AV$"."D0"));
/* MV_REFRESH (DEL) */ DELETE FROM "GROCERY"."SUMMARY_MAV" "SNA$"
WHERE "SNA$"."CNT"=0;
/* MV_REFRESH (MRG) */ MERGE INTO "GROCERY"."SUMMARY_MAV" "SNA$"
USING
 (SELECT /*+ OPT_ESTIMATE(QUERY_BLOCK MAX=1000) */
    "MAS$3"."WEEK" "GB0", "MAS$2"."STORE_KEY" "GB1",
    "MAS$2"."STORE_NAME" "GB2", "MAS$1"."PROMOTION_KEY" "GB3",
    SUM(1* DECODE(("MAS$3"."DOLLAR_SALES"),NULL,0,1)) "D0", SUM(1)
"D1",
    NVL(SUM(1* ("MAS$3"."DOLLAR_SALES")), 0) "G0"
   FROM (SELECT /*+ CARDINALITY(MAS$ 1) */
           CHARTOROWID("MAS$"."M_ROW$$") RID$,
           "MAS$"."TIME_KEY"
        FROM "GROCERY"."MLOG$_TIME" "MAS$"
        WHERE "MAS$".SNAPTIME$$ > :1 ) AS OF SNAPSHOT (:2) "DLT$0" ,
       (SELECT "MAS$"."ROWID" "RID$" , "MAS$"."PROMOTION_KEY"
        FROM "GROCERY"."PROMOTION" "MAS$") AS OF SNAPSHOT (:2)
"MAS$1" ,
       (SELECT "MAS$"."ROWID" "RID$" , "MAS$"."STORE_NAME",
          "MAS$"."STORE_KEY"
        FROM "GROCERY"."STORE" "MAS$") AS OF SNAPSHOT (:2) "MAS$2",
       (SELECT "MAS$"."ROWID" "RID$", "MAS$"."WEEK",
          "MAS$"."STORE_KEY", "MAS$"."TIME_KEY",
          "MAS$"."PROMOTION_KEY", "MAS$"."DOLLAR_SALES"
        FROM "GROCERY"."FACT" "MAS$") AS OF SNAPSHOT (:2) "MAS$3"
  WHERE ("MAS$2"."STORE_KEY"="MAS$3"."STORE_KEY" AND
         "MAS$3"."TIME_KEY"="DLT$0"."TIME_KEY" AND
         "MAS$3"."PROMOTION_KEY"="MAS$1"."PROMOTION_KEY")
  GROUP BY "MAS$3"."WEEK","MAS$2"."STORE_KEY","MAS$2"."STORE_NAME",
        "MAS$1"."PROMOTION_KEY")"AV$"
ON (SYS_OP_MAP_NONNULL("SNA$"."WEEK")=
     SYS_OP_MAP_NONNULL("AV$"."GB0") AND
   SYS_OP_MAP_NONNULL("SNA$"."STORE_KEY")=
     SYS_OP_MAP_NONNULL("AV$"."GB1") AND
   SYS_OP_MAP_NONNULL("SNA$"."STORE_NAME")=
     SYS_OP_MAP_NONNULL("AV$"."GB2") AND
   SYS_OP_MAP_NONNULL("SNA$"."PROMOTION_KEY")=
     SYS_OP_MAP_NONNULL("AV$"."GB3"))
WHEN MATCHED THEN
UPDATE SET "SNA$"."CNT_DSALES"="SNA$"."CNT_DSALES"+"AV$"."D0",
   "SNA$"."CNT"="SNA$"."CNT"+"AV$"."D1",
   "SNA$"."AVG_SALES"=
     DECODE("SNA$"."CNT_DSALES"+"AV$"."D0",0,TO_NUMBER(NULL),
((NVL("SNA$"."AVG_SALES",0)*"SNA$"."CNT_DSALES")+"AV$"."G0")/
       ("SNA$"."CNT_DSALES"+"AV$"."D0"))
WHEN NOT MATCHED THEN
INSERT ("SNA$"."WEEK", "SNA$"."STORE_KEY", "SNA$"."STORE_NAME",
        "SNA$"."PROMOTION_KEY",
        "SNA$"."CNT_DSALES", "SNA$"."CNT", "SNA$"."AVG_SALES")
VALUES ( "AV$"."GB0", "AV$"."GB1", "AV$"."GB2", "AV$"."GB3",
```

-continued

```
"AV$"."D0", "AV$"."D1",
DECODE("AV$"."D0", 0, TO_NUMBER(NULL),
  AV$"."G0"/"AV$"."D0"))
```

The refresh statement generation for Phase 1 of FIG. 1 is the same as that for log-based incremental refresh. The difference is that only the changes on the non-PCT tables are addressed in the above phase and the changes (often large but focused in a small number of partitions) on PCT tables are intentionally left to the next phase.

Referring to FIG. 2, phase 2 of the mix incremental refresh execution is to specifically apply PCT base table changes to the materialized view. FIG. 2 illustrates the application of PCT table changes using partition change tracking information. The data in the materialized view affected by partition changes in FACT 101 and STORE 102 are recomputed. In this example, FACT and STORE are PCT base tables and their changes are tracked by partition scn (system change number) changes on all their partitions. In this phase, there are two basic operations: one is removing affected rows in the materialized view and the other is re-computing new rows to insert into the materialized view.

Figure 3:
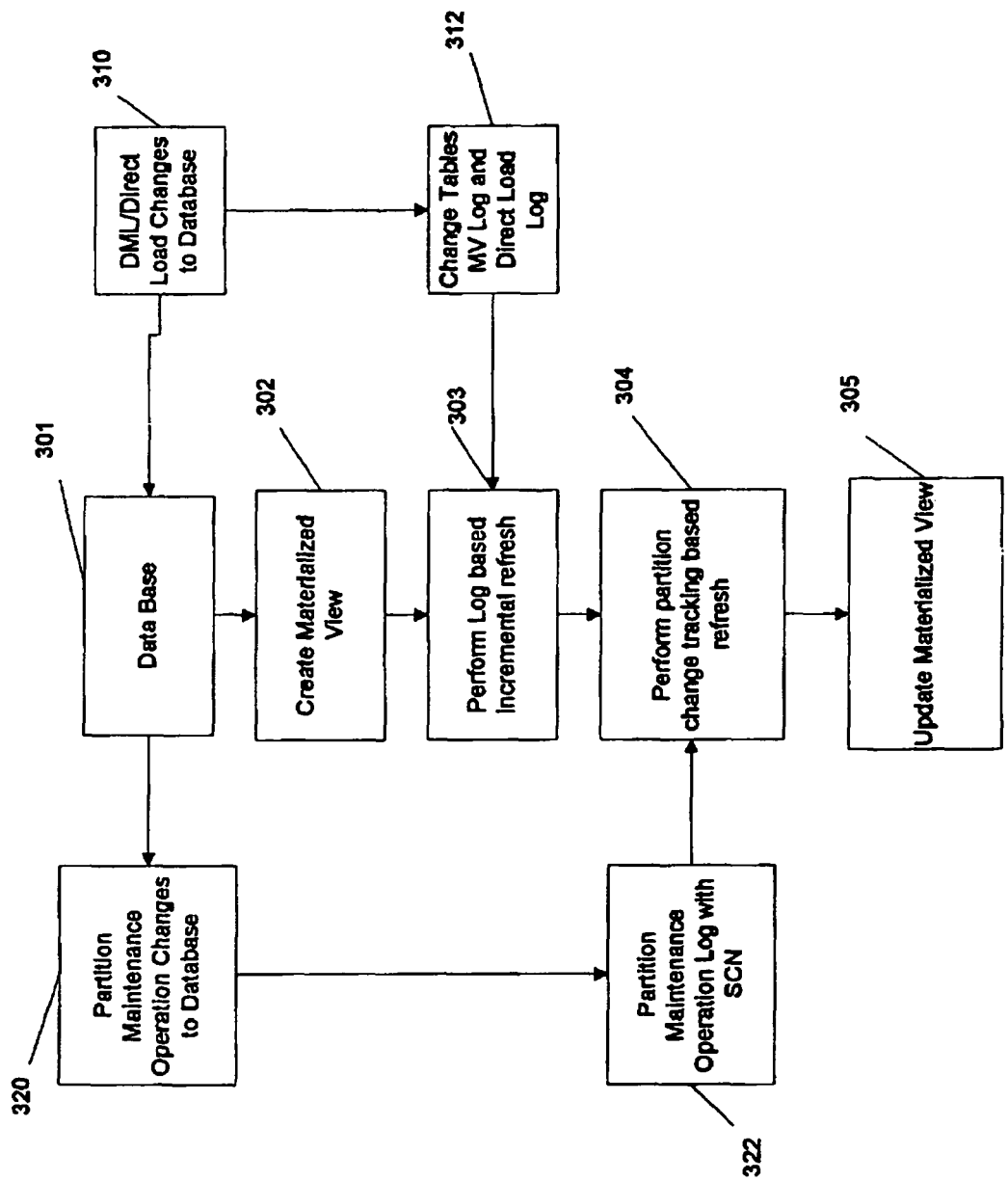
FIG. 3 is a flowchart of one embodiment of a mix incremental refresh process incorporating features of the present invention.

FIG. 3 illustrates a basic flow diagram incorporating features of the present invention. The materialized view 302 can be generated based on the database 301. DML/Direct load changes 310 made to the database 301 can be received in the table MV Log and/or direct load log 312. Partition maintenance operation changes 320 to the data base 301 are received 322 in the partition maintenance log. During the first phase shown in FIG. 1, log based incremental refresh changes 303 are made using the materialized view log and/or direct load log 312. Then, in the second phase, the partition change tracking refresh 304, based on the partition maintenance operation log with SCN 322, is performed to form the updated materialized view 305.

The following refresh statements are generated to refresh the materialized view SUMMARY_MAV in phase 2 with the changes from FACT and STORE. There are two statements generated: one is DELETE statement and the other is INSERT statement. The DELETE statement removes the affected rows in the materialized view based on the partition bound information (i.e., list of WEEK values in FACT and range predicate of STORE_KEY in STORE). Then, an INSERT statement using the same partition bound information is used to re-compute new rows to be inserted into the materialized view.

```
/* MV_REFRESH (DEL) */ DELETE FROM "GROCERY"."PART_EUT_DM_MV"
WHERE (16 <= "STORE_KEY" AND "STORE_KEY" < 25) OR
    ("WEEK" IN (199748, 199749, 199750))   OR ...
      );
/* MV_REFRESH (INS) */ INSERT /*+ BYPASS_RECURSIVE_CHECK */
INTO "GROCERY"."PART_EUT_DM_MV"
SELECT /*+ X_DYN_PRUNE */ "PF"."WEEK" , "S"."STORE_KEY" ,
    "S"."STORE_NAME" ,"P"."PROMOTION_KEY" , AVG("PF"."DOLLAR_SALES"),
    COUNT(*) , COUNT("PF"."DOLLAR_SALES")
FROM "TIME1" "T","PROMOTION1" "P","PART_STORE" "S","PART_FACT_TIME"
"PF"
WHERE ("S"."STORE_KEY"="PF"."STORE_KEY" AND
    "PF"."TIME_KEY"="T"."TIME_KEY" AND
    "PF"."PROMOTION_KEY"="P"."PROMOTION_KEY") AND
    ( (16 <= "S"."STORE_KEY" AND "S"."STORE_KEY" < 25) OR
      ( ("PF"."WEEK" IN (199748, 199749, 199750)) OR ...
        ))
GROUP BY
"PF"."WEEK","S"."STORE_KEY","S"."STORE_NAME","P"."PROMOTION_KEY";
```

Furthermore, if the materialized view is partitioned on the same column as one of the PCT base tables, the DELETE statement in phase 2 can further be optimized using TRUNCATE PARTITION statements which can efficiently remove affected rows in the materialized view.

This solution combines and takes advantage of both log-based (FAST) refresh and PCT incremental refresh to achieve the functionality of handling arbitrarily complex change scenarios and lifting big restrictions on materialized view log dependency. Also, it delivers better performance for materialized view incremental refresh on common change scenarios in the data warehouse applications.

One mechanism of partition change tracking and logical partitioning of a materialized view can include logically dividing the materialized view into multiple sections so that each of the sections has its own freshness state and enable query rewrite even when the materialized view is not globally fresh. This is achieved by logical dividing. The data in the fresh sections can be used for query rewrite to speed up the query processing. A partition-change-based incremental refresh approach is provided for the materialized view. Incremental refresh therefore becomes possible after the partition maintenance operations happen to the base partitioned table or after some cases that can not be handled by the existing row-change-based refresh approach. This can be achieved by utilizing the partitioned base table of the materialized view. When one or more base tables are partitioned (i.e., by range or by list of values) and the defining query of the materialized view has the partition key/marker column in its SELECT list, then the partition change tracking mechanism becomes possible.

Figure 4:
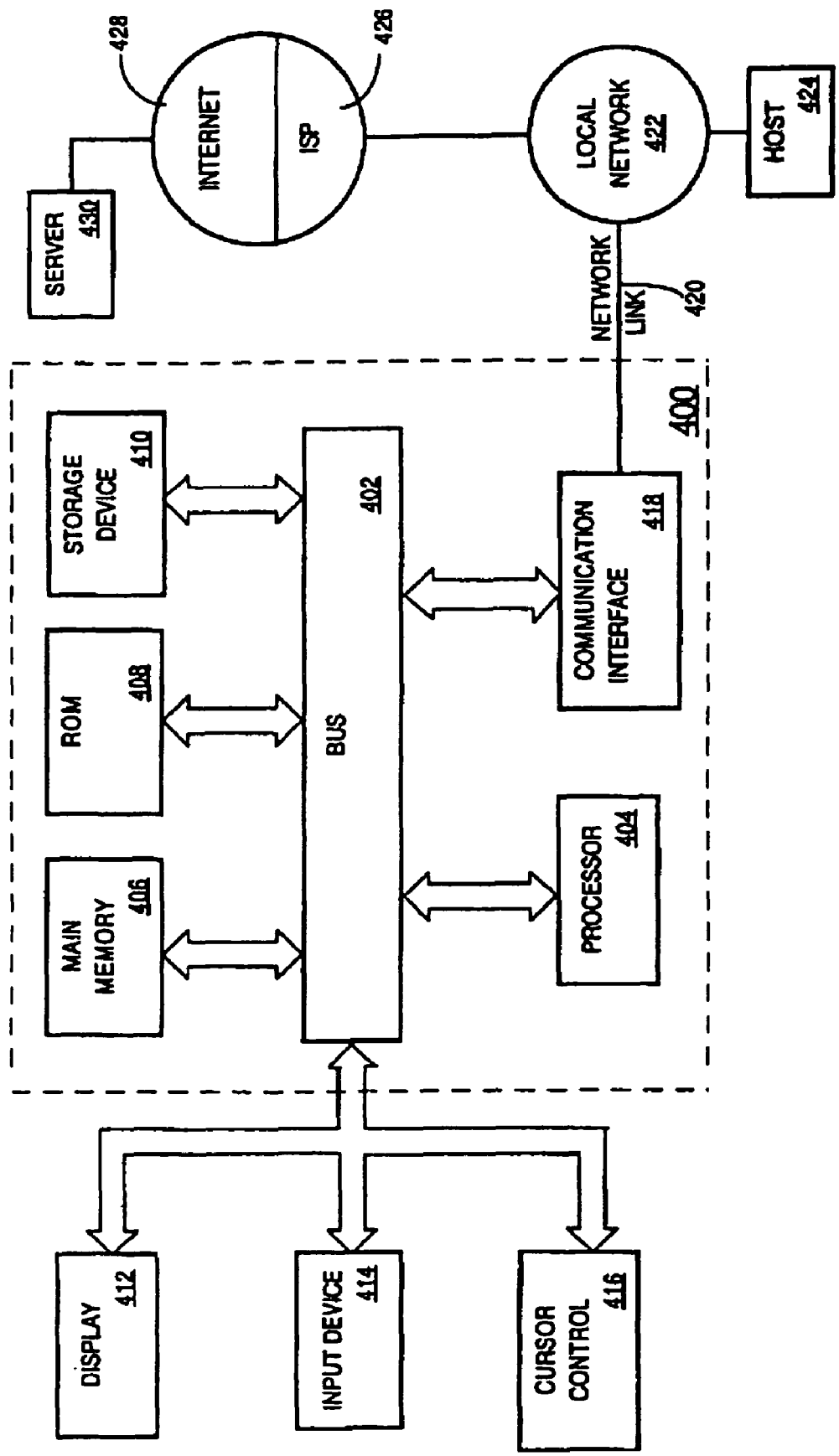
FIG. 4 is a block diagram of one embodiment of a typical apparatus that can be used to practice the present invention.

FIG. 4 illustrates a computer system 400 upon which an embodiment of the invention may be implemented. As shown in FIG. 4, the system 400 generally includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. System 400 can also include a read only memory (ROM) 408 or other static storage device coupled to bus 402 for storing static information and instructions for processor 404. A storage device 410, such as a magnetic disk or optical disk, can be coupled to bus 402 for storing information and instructions.

Computer system 400 may also be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The disclosed embodiments are related to the use of computer system 400 for the mix incremental refresh of materialized views. According to one embodiment of the invention, the mix incremental refresh process of the disclosed embodiments can be provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multiprocessing arrangement may also be employed to execute the sequences of instructions contained in main memory 406. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media can include for example, dynamic memory, such as main memory 406. Transmission media can include for example, coaxial cables, copper wire and fiber optics, including the wires that comprise bus 402. Transmission media can also take the form of acoustic or light waves, such as those generated during radio wave and infrared data communications.

Common forms of computer-readable media include for example, a floppy disk, a flexible disk, hard disk, magnetic tape, or any other magnetic medium, a CD-ROM, any other optical medium, a RAM, a PROM, an EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

As illustrated in FIG. 4, the computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for incrementally refreshing materialized views as described herein.

The received code may be executed by processor 404 as it is received, and/or stored in storage device 410, or other non-volatile storage for later execution. In this manner, computer system 400 may obtain application code in the form of a carrier wave.

The mix incremental refresh mechanism of the present invention delivers both functionality and performance advantages in the area of materialized view incremental maintenance. Some of these benefits include enabling incremental refresh of the materialized view in the general update scenario where both partitioned and non-partitioned base tables are changed with mixed operations including conventional DMLs, direct patch load and partition maintenance operations. Previously, no existing incremental refresh method could handle such general cases. In the data warehouse environment where the data stored in tables are often very large, table partitioning has been an efficient and widely adopted approach to manage data. In this environment, not only base tables but also materialized views are likely partitioned. Therefore, such update scenarios with mixed change operations are becoming more and more common. Supporting incremental refresh for such cases is increasingly important. Without it, only expensive complete refresh method can be used to synchronize the data from the base tables to the materialized view.

The present invention also eliminates the dependency on the materialized view for partitioned base tables, which is a requirement for conventional incremental refresh method. Without the dependency, the partitioned base tables will no longer need materialized view logs to support materialized view incremental refresh under all kinds of update scenarios. The most significant value is to save the heavy cost of materialized view log both in storage and in maintenance. With the present invention there is no need to create a materialized view log for the partitioned base table. Thus, more storage space will become available, and since there is no materialized view log, there is no need to record the changes of the base table while doing conventional DML operations. As a result, conventional DML operations can perform cleaner and faster without such logging burden. Finally, in the materialized view refresh process of the present invention, there is no need to do refresh log setup and purging. Currently, such log maintenance is a part of the refresh process and causes big performance overhead during refresh.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method executed in a computer system comprising:
updating changes from both partition change track tables and non-partition track tables in a single materialized view refresh process with two consecutive phases wherein:
a first phase performs a log-based incremental update on the materialized view; and
a second phase performs a partition change tracking based update on the materialized view,
where the materialized view has both partition change track base tables and non-partition change track base tables, where a materialized view log is present for the non-partition change track base tables, and where a materialized view log is not present for the partition change track base tables.

2. The method of claim 1 further comprising applying changes of the non-partition change tracking base tables in the first phase using a materialized view log and/or direct load log to the materialized view.

3. The method of claim 2 further comprising applying changes of the partition change tracking base tables in the second phase using partition change information to the materialized view.

4. The method of claim 1 further comprising:
in the first phase, applying row changes from the non-partition change tracking base tables to the materialized view using a materialized view log and/or direct load log; and
in the second phase, applying partition changes from the partition change tracking base tables to the materialized view without using a materialized view log for the partition change tracking base tables.

5. A method of two-phase incremental maintenance of a materialized view in a computer system comprising:
in a first phase, applying row changes from non-partition change tracking base tables to the materialized view; and
in a second phase, applying partition changes from the partition change tracking base tables to the materialized view,
where the materialized view has both partition change track base tables and non-partition change track base tables, where a materialized view log is present for the non-partition change track base tables, and where a materialized view log is not present for the partition change track base tables.

6. The method of claim 5 wherein applying the row changes from the non-partition change tracking base table to the materialized view in the first phase comprises using a materialized view log and/or direct load log, and applying partition changes from the partition change tracking base tables to the materialized view in the second phase comprises not using a materialized view log for the partition change tracking base tables.

7. The method of claim 5 wherein the partition change tracking base tables applied in the second phase are materialized view log independent.

8. The method of claim 5 further comprising creating a fast refresh partition change tracking materialized view without validating an existence of a materialized view log for the partition change tracking table.

9. A method of two-phase incremental refresh of a materialized view in a computer system comprising:
applying changes of non-partition change track base tables using materialized view logs to the materialized view in a first phase; and
applying changes of partition change track base tables using partition change information to the materialized view in a second phase,
where the materialized view has both partition change track base tables and non-partition change track base tables, where a materialized view log is present for the non-partition change track base tables, and where a materialized view log is not present for the partition change track base tables.

10. The method of claim 9, further comprising that the partition change information in the second phase of the refresh are partition system change numbers.

11. The method of claim 9 wherein applying the changes of the non-partition change track base tables using materialized view logs to the materialized view in the first phase of the refresh further comprises applying row changes from the non-partition change track base tables to the materialized view.

12. The method of claim 9 wherein the partition change track tables applied in the second phase are materialized view log independent.

13. A method of two-phase fast incremental refresh of a materialized view executed in a computer system comprising:
creating a materialized view from one or more base tables including at least one partitioned partition change tracking base table and at least one non-partitioned base table;
storing partition keys of the at least one partitioned partition change tracking base table on a defining query of the materialized view;
creating materialized view logs for all non-partitioned base tables;

applying any row changes from the at least one non-partition change tracking base table to the materialized view in a first phase; and applying partition changes from the at least one partition change tracking base table to the materialized view in a second phase.

14. The method of claim 13 further comprising the at least one partitioned partition change tracking base table referenced in the second phase not having an associated materialized view log.

15. The method of claim 14 further comprising:

applying row changes from the non-partition change tracking base tables to the materialized view using a materialized view log in the first phase; and applying the partition changes from the at least one partition change tracking base tables to the materialized view without using a materialized view log in the second phase.

16. The method of claim 14 further comprising, in the first phase, applying changes from the at least one non-partition change tracking base tables individually and removing intermediate results from the materialized view that are not semantically meaningful.

17. A computer program product embodied in a non-transitory computer readable medium for executing the method of claim 1 when run on a processing system such as a computer.

18. A non-transitory computer-readable medium storing computer-executable instructions that when executed by a computer cause the computer to perform a method, the method comprising:

updating changes from both partition change track tables and non-partition track tables in a single materialized view refresh process with two consecutive phases wherein:

a first phase performs a log-based incremental update on the materialized view; and a second phase performs a partition change tracking based update on the materialized view, where the materialized view has both partition change track base tables and non-partition change track base tables, where a materialized view log is present for the non-partition change track base tables, and where a materialized view log is not present for the partition change track base tables.

19. A non-transitory computer-readable medium storing computer-executable instructions that when executed by a computer cause the computer to perform a method, the method comprising:

in a first phase, applying row changes from non-partition change tracking base tables to the materialized view; and in a second phase, applying partition changes from the partition change tracking base tables to the materialized view, where the materialized view has both partition change track base tables and non-partition change track base tables, where a materialized view log is present for the non-partition change track base tables, and where a materialized view log is not present for the partition change track base tables.

20. A non-transitory computer-readable medium storing computer-executable instructions that when executed by a computer cause the computer to perform a method, the method comprising:

applying changes of non-partition change track base tables using materialized view logs to the materialized view in a first phase; and applying changes of partition change track base tables using partition change information to the materialized view in a second phase, where the materialized view has both partition change track base tables and non-partition change track base tables, where a materialized view log is present for the non-partition change track base tables, and where a materialized view log is not present for the partition change track base tables.

* * * * *